Feb. 17, 1970
C. M. OLIVEIRA
3,495,750
LUGGAGE RACK
Filed Feb. 27, 1968
2 Sheets-Sheet 1
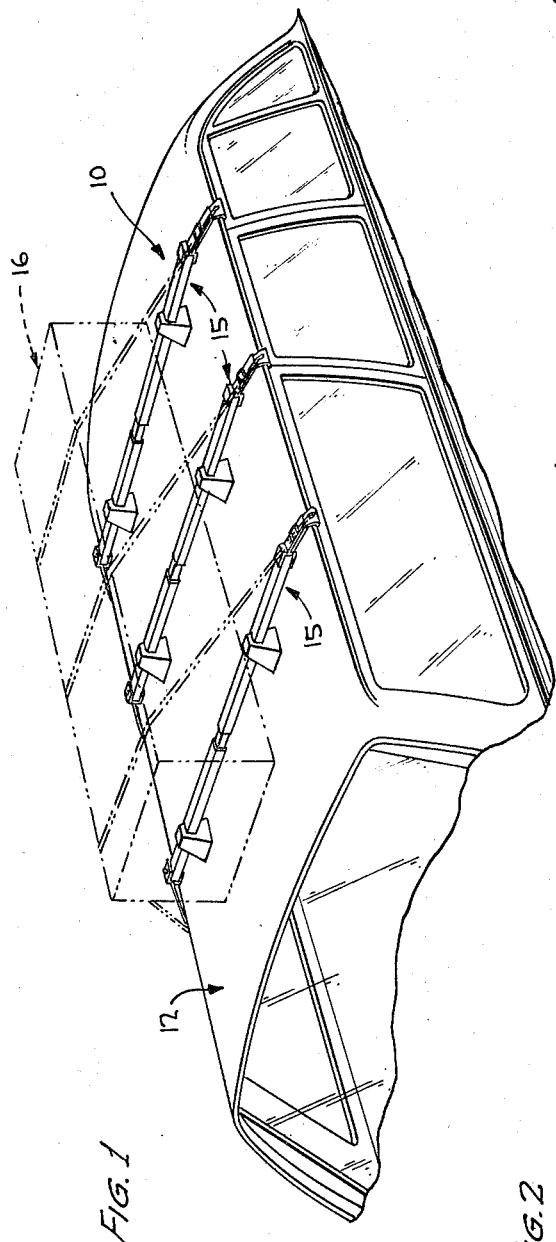
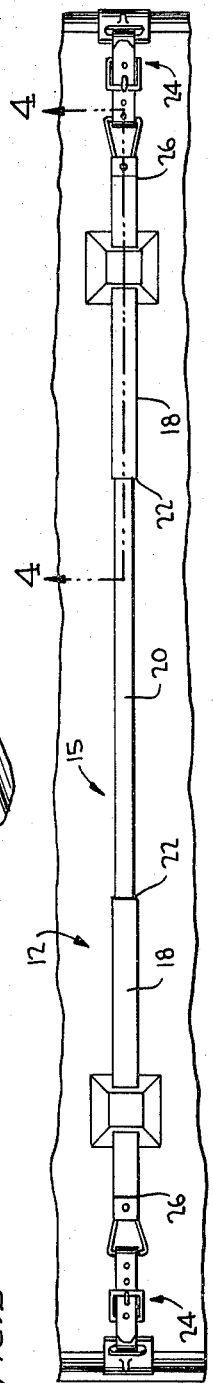
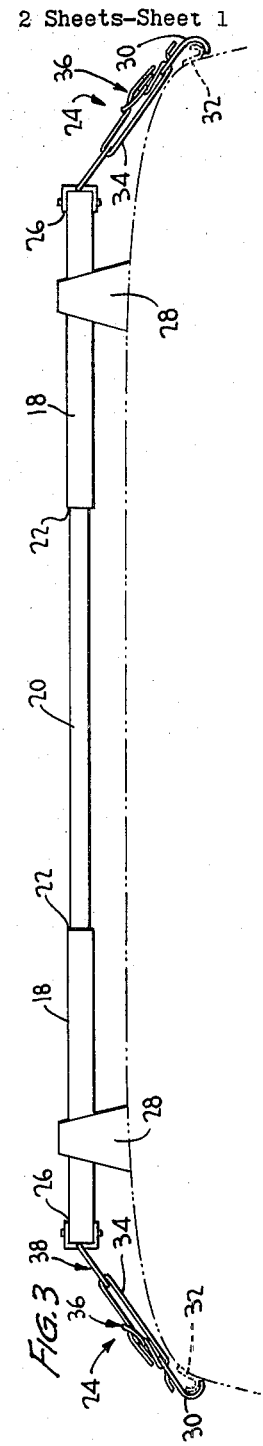
INVENTOR,
CASIMIRO MILHEIRO OLIVEIRA
BY Jacobi & Davidson
ATTORNEYS Feb. 17, 1970    C. M. OLIVEIRA    3,495,750
LUGGAGE RACK
Filed Feb. 27, 1968    2 Sheets-Sheet 2
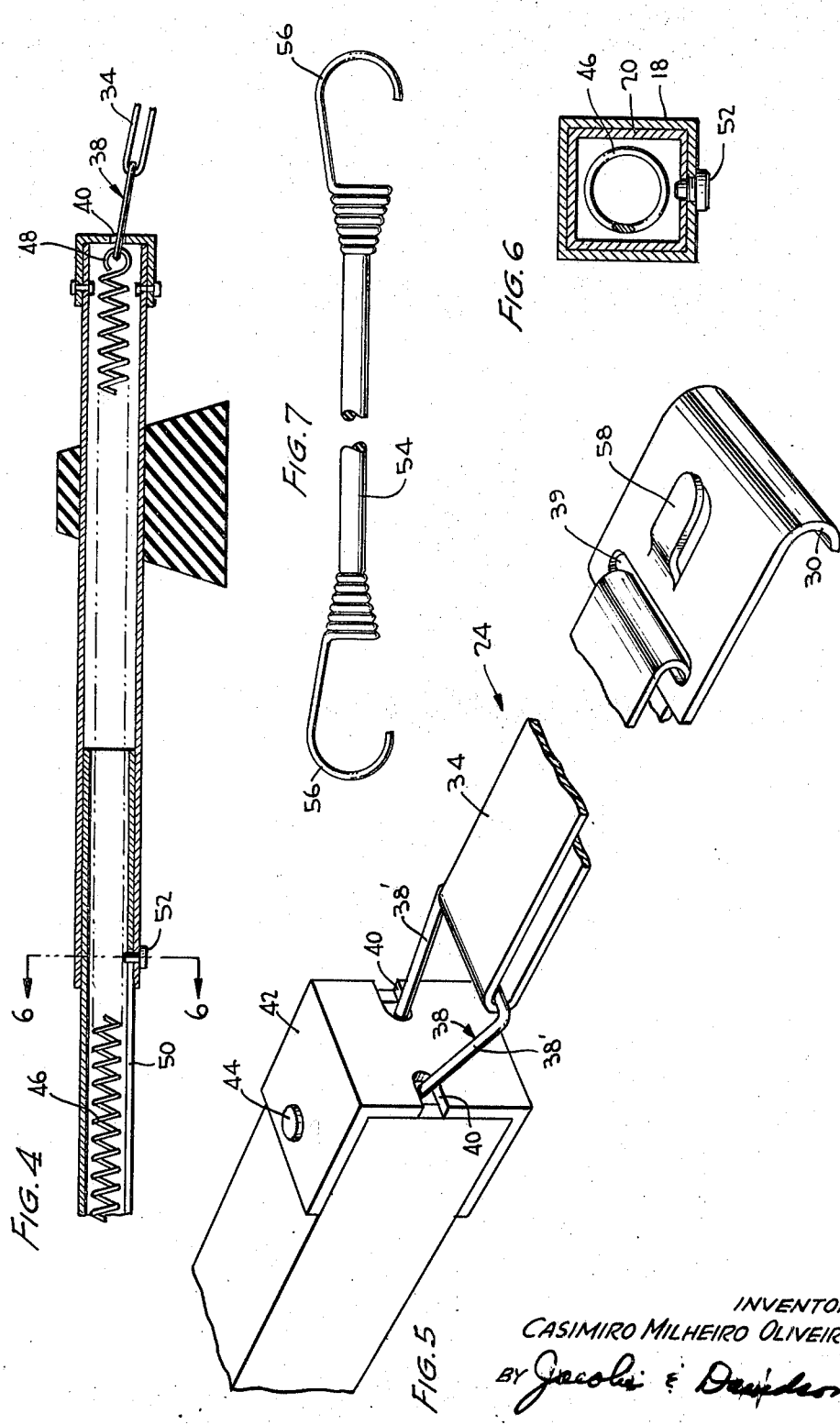
INVENTOR,
CASIMIRO MILHEIRO OLIVEIRA
BY Jacobi & Davidson
ATTORNEYS United States Patent Office 3,495,750
Patented Feb. 17, 1970

3,495,750
LUGGAGE RACK
Casimiro Milheiro Oliveira, Av. Universidad, Edif.
Alvarena, Caracas, Venezuela
Filed Feb. 27, 1968, Ser. No. 708,681
Int. Cl. B60r 9/04
U.S. Cl. 224—42.1          12 Claims

ABSTRACT OF THE DISCLOSURE

Luggage rack for use with vehicles comprising a plurality of adjustable support assemblies each including telescoping hollow bars with a spring means passing through the interior thereof and having its opposed ends secured in relation to the outer ends of the support assembly to urge the assembly toward a contracted relationship. Attaching means including adjustable belts and raingutter-engaging hooks are carried by the outer ends of the bars with deformable, preferably rubber, support elements carrying the bars and seating on the vehicle. The raingutter-engaging hooks can each include a tongue for reception of a flexible means such as a rubber band or the like utilized to releasably secure luggage or other material to be carried on the rack. The rack is adapted to fit different size vehicles and, additionally, can be collapsed to a compact relationship for storage.

---

The present invention deals with racks for vehicles, and more particularly with luggage racks and the like which have the ability of being adaptable to different size vehicles and which can further be readily collapsed and even disassembled for storage in a small space.

Luggage racks are, of course, well known and are commonly used on the roofs of various automobile vehicles for carrying hand luggage as well as various bulky items such as furniture or the like. Ordinarily, such luggage racks are either of the permanent type which are directly affixed to the roof of a vehicle at the factory and are not readily removed therefrom, or the temporary type which may be secured to the vehicle roof, when desired, and removed when not in use. The instant invention deals with the latter type of luggage rack in that it is adapted to be readily affixed in position on a vehicle when needed and removed therefrom for storage.

Prior art removable-type luggage racks have suffered from several disadvantages. First of all, such luggage racks, when removed from the vehicle are quite bulky and cannot be stored in a relatively small space. Additionally, such luggage racks are frequently relatively complex whereby they are difficult to use, expensive to manufacture and maintain.

Thus, it is a primary object of the instant invention to provide a rack for luggage or the like which is readily engageable with a vehicle and removable therefrom and which, when removed, can be collapsed, and, in fact, disassembled, if desired, for storage in a relatively small space, for example, in a vehicle trunk or the like.

Additionally, it is an important object of the instant invention to provide a rack for luggage and the like which is readily adapted for use with vehicles of different size as well as for use with vehicles of different nature. In this regard, the rack of the instant invention is easily adjusted to fit vehicles having different widths and may be engaged with either a roof of a vehicle as is common, or the rear portion or trunk surface of a vehicle, if desired. Thus, the rack of the instant invention is adapted to accommodate ordinary automobile vehicles, station wagons, vans, micro buses, panel trucks and the like.

Yet another object of the instant invention is to provide a rack formed of a plurality of individual support assemblies whereby any number of such assemblies may be utilized depending upon the length of the vehicle and the particular article or articles to be carried thereby. In this manner, the rack of the instant invention will be seen to be extremely flexible in use since each support assembly is individually adjustable to accommodate vehicles of different widths and since any number of support assemblies may be utilized in a particular instance to accommodate vehicles or articles of different length.

A still further important object of this invention is the provision of a rack of the type described which is simple and inexpensive to manufacture, sturdy and durable in construction and yet highly reliable in use. In this same vein, the instant invention contemplates the provision of a rack which is easily maintained, the individual elements thereof being readily replaceable in the event of damage thereto since each of the support assemblies are capable of substantially complete disassembly with ordinary tools.

Other objects reside in the combination of elements, arrangement of parts and features of construction. Still other objects will in part be obvious and in part be pointed out as the description of the invention proceeds and as shown in the accompanying drawings wherein:

FIGURE 1 is a fragmentary view of the upper portion of a station wagon provided with a luggage rack according to the instant invention, an article carried thereby being shown in dotted lines;

FIGURE 2 is a fragmentary enlarged top plan view of one of the support assemblies of the rack shown in FIGURE 1;

FIGURE 3 is a side elevational view of the support assembly as shown in FIGURE 2;

FIGURE 4 is a fragmentary enlarged cross-sectional view taken substantially on the lines 4—4 of FIGURE 2;

FIGURE 5 is a still further enlarged fragmentary perspective view of one end of a support assembly, parts being broken away for illustrative convenience;

FIGURE 6 is an enlarged transverse cross-sectional view taken substantially on lines 6—6 of FIGURE 4; and FIGURE 7 is an enlarged elevational view, partly broken away for illustrative convenience, of a hold-down strap for use with the luggage rack of the instant invention.

Like reference characters refer to like parts throughout the several views of the drawings.

Referring now to the drawings in general, and more particularly to FIGURE 1, a rack according to the instant inventive concepts is designated generally by the reference numeral 10 and is shown as carried on the roof of a vehicle designated generally as 12. The rack 10 includes a plurality of support assemblies 15, three such assemblies being shown in FIGURE 1 as illustrative. It is to be understood that the number of support assemblies 15 and the spacing therebetween can be varied depending upon the particular vehicle with which the rack 10 is to be utilized and also depending upon the size of the article to be carried thereby. For illustrative purposes, an article 16 has been shown in dotted lines as carried by the three support assemblies 15.

Each support assembly 15 includes a pair of hollow side rods 18 shown as generally square in cross-section, and a hollow center rod 20 also being of square cross-section and being adapted to slide within the side rods 18. While a square cross-section is shown as illustrative for the side and center rods, and while a quadrangular cross-section is desirable, it is to be understood that other cross-sections may be utilized.

The inner ends 22 of the side rods 18 are open and face each other in the related assembly and attaching means 24 are secured to the outer ends 26 of the side rods 18 in a manner and for a purpose to be described in more detail hereinafter.

Support elements 28, preferably formed of rubber and preferably having the shape of a frustum of a pyramid are provided for each side rod 18. Although one such support element 28 is shown associated with each side rod 18 in the drawings, it will be understood that additional support elements may be utilized, if desired. Further, although the support elements 28 are preferably formed of rubber, other suitable materials may be utilized therefor. However, it is desirable that the support elements are somewhat deformable so that their lower surface can accommodate itself to the configuration of the portion of the vehicle which it engages. Additionally, it is desirable that at least the lower surface of the support elements 28 be relatively soft so as to not mar the vehicle surface. In any event, each support element 28 includes a transverse opening therethrough which slidingly accommodates the side rods 18 to facilitate positioning the support assemblies 15 on the surface of the vehicle 12.

The attaching means 24 is adapted for securement to any desired portion of a vehicle 12. In the embodiment shown in the drawings, it includes a hook 30 designed to engage over the raingutter 32 of vehicle 12, a belt having an adjustable buckle 36 that engages in an opening 39 in the hook 30 and also a wire connector 38 which passes through openings 40 in the end caps 42 that are riveted as shown at 44 to the outer ends 26 of the side rods 18.

A spring means 46 passes through the interior of the center rod 20 and the side rods 18, opposite ends 48 of the spring means 46 engaging over the wire connector 38 as will be seen particularly in FIGURES 4 and 5. The shape of the wire connector 38 is such that the diverging legs 38' thereof bear against the outer ends of the side rods 18 whereby the spring means 46 normally urges the side rods 18 toward each other to a contracted relationship on the center rod 20.

The center rod 20 preferably has a guide slot 50 extending over the major extent of its length, with the ends of the guide slot 50 being closed. Guide pins in the form of screw members 52 are threadably secured adjacent the inner ends 22 of each side rod 18 and slideably engaged in the guide slot 50, these guide pins 52 precluding accidental separation of the center rod 20 from the side rods 18.

Finally, a hold-down strap, one embodiment of which is illustratively shown in FIGURE 7 at 54, may be provided with each support assembly 15, the opposite ends of this hold-down strap 54 having hooks 56 adapted to engage over upstanding tongues 58 defined on the hooks 30. The hold-down straps 54 are preferably formed of a resilient material such as rubber and are utilized to secure an article 16 to the support assemblies 15.

The use and operation of the rack of the instant invention will be readily understood. Preferably, the side rods 18 are of substantially equal length and the center rod 20 is of a length substantially equal to the total length of both side rods thereby effectively providing an extensibility of approximately 100 percent for each support assembly.

Any desired number of support assemblies 15 may be positioned in a desired location on the surface of a vehicle, with the hooks 30 being engaged with a portion of the vehicle, such as the raingutter, on each side of the support assembly. With the buckle means 36 adjusting each belt to a desired length, engagement of the hooks 30 with the vehicle withdraws the side rods 18 from the center rod 20 a distance sufficient to accommodate the width of the vehicle. The side rods 18 will not be accidentally completely withdrawn from the center rod 20 due to the action of the guide pins 52 against the ends of the guide slot 50. The spring means 46 continually act to retract the side rods 18 on the center rod 20 thereby maintaining good engagement between the hooks 30 and the vehicle.

After placing one or more articles on the support means 15, hold-down straps such as shown at 54 may be engaged over the tongues 58 and over the articles to secure the articles to the rack.

When it is desired to disassemble the rack, each of the support assemblies 15 may be removed by merely disengaging the hooks 30 from the vehicle against the action of the spring means 46. If desired, each support assembly 15 may be stored in its contracted relationship, since the spring means 46 will tend to pull the side rods 18 together. Alternatively, each support assembly 15 may be completely disassembled merely by disengaging the ends 48 of the spring means 46 from the wire connectors 38 and removing the guide pins 52. In this manner, all of the individual elements of the support means 15 may be readily stored in a small area. Additionally, in the event of damage to any individual element, it may be readily replaced.

Thus, it will now be seen that there is herein provided a rack which satisfies all of the objects of the instant invention, and others, including many advantages of great practical utility and commercial importance.

Since many embodiments may be made of the instant inventive concepts, and since many modifications may be made of the embodiments hereinbefore shown and described, it is to be understood that all matter herein is to be interpreted merely as illustrative and not in a limiting sense.

What is claimed is:

1. A rack comprising a plurality of support assemblies for positioning at juxtaposed, spaced locations on a vehicle and for cooperatively carrying thereon luggage and the like; each of said support assemblies including a pair of hollow side rods of similar internal cross-section, said side rods having open inner ends facing each other and outer ends spaced from said inner ends, a hollow center rod of external cross-section similar to said internal cross-sections of said side rods, said center rod having opposed end portions slidingly received within said side rods, a spring passing through the interior of each of said side and center rods and having opposed ends secured in relation to said outer ends of side rods whereby said spring urges said inner ends of said side rods towards each other, at least one support element for each of said side rods, each support element having a transverse opening slidingly receiving its related side rods, said support elements engaging said vehicle and spacing said side and center rods from the surface of said vehicle, and attaching means attached, respectively, to the terminal ends of the spring at said outer end of each side rod for securing said end of said side rod to a portion of said vehicle.

2. The rack of claim 1 wherein said side and center rods are quadrangular in cross-section.

3. The rack of claim 1 wherein said side rods are substantially equal in length and center rod is of a length substantially equal to the total length of both side rods.

4. The rack of claim 1 wherein said center rod includes a longitudinally extending guide slot extending over the major extent of its length, the ends of said guide slot being closed, and guide pins carried by side rods adjacent said inner ends thereof and slidingly engaged in said guide slot.

5. The rack of claim 1 wherein said support elements include a deformable lower surface formed of a relatively soft material for adapting itself to the surface of said vehicle which it engages without marring said vehicle surface.

6. The rack of claim 5 wherein said support elements are in the shape of a frustum of a pyramid.

7. The rack of claim 1 wherein said attaching means include an adjustable element, and a hook carried by said adjustable element for engaging the raingutter of said vehicle.

8. The rack of claim 7 wherein said adjustable element is a belt including buckle means for adjustment of the same.

9. The rack of claim 7 wherein each of said hooks includes an upstanding tongue adapted for engagement of one end of a flexible element for releasably securing luggage and the like on said rack.

10. The rack of claim 1 wherein said side and center rods are quadrangular in cross-section, said side rods are substantially equal in length and said center rod is of a length substantially equal to the total length of both side rods, said center rod including a longitudinally extending guide slot extending over the major extent of its length, the ends of said guide slot being closed, and guide pins carried by said side rods adjacent said inner ends thereof and slidingly engaged in said guide slot, said support elements being in the shape of a frustum of a pyramid and including a deformable lower surface formed of a relatively soft material for adapting itself to the surface of said vehicle which it engages without marring said vehicle surface, said attaching means including an adjustable belt, a hook carried by said belt for engaging the raingutter of said vehicle, and an upstanding tongue carried by each of said hooks and adapted for engagement of one end of a flexible element for releasably securing luggage and the like on said rack.

11. A rack comprising a plurality of support assemblies for positioning at juxtaposed, spaced locations on a vehicle and for cooperatively carrying thereon luggage and the like; each of said support assemblies including a pair of hollow side rods of similar internal cross-section, said side rods having open inner ends facing each other and outer ends spaced from said inner ends, a hollow center rod of external cross-section similar to said internal cross-sections of said side rods, said center rod having opposed end portions slidingly received within said side rods, spring means passing through the interior of each of said side and center rods and having opposed ends secured in relation to said outer ends of side rods whereby said spring means urge said inner ends of said side rods towards each other, at least one support element for each of said side rods, each support element having a transverse opening slidingly receiving its related side rods, said support elements engaging said vehicle and spacing said side and center rods from the surface of said vehicle, and attaching means carried at said outer end of each side rod for securing said end of said side rod to a portion of said vehicle, said attaching means including an adjustable element and a hook carried by said adjustable element for engaging the raingutter of said vehicle, each of said hooks including an upstanding tongue adapted for engagement of one end of a flexible element for releasably securing luggage and the like on said rack.

12. A rack comprising a plurality of support assemblies for positioning at juxtaposed, spaced locations on a vehicle and for cooperatively carrying thereon luggage and the like; each of said support assemblies including a pair of hollow side rods of similar internal cross-section, said side rods having open inner ends facing each other and outer ends spaced from said inner ends, a hollow center rod of external cross-section similar to said internal cross-sections of said side rods, said center rod having opposed end portions slidingly received within said side rods, spring means passing through the interior of each of said side and center rods and having opposed ends secured in relation to said outer ends of side rods whereby said spring means urge said inner ends of said side rods towards each other, at least one support element for each of said side rods, each support element having a transverse opening slidingly receiving its related side rods, said support elements engaging said vehicle and spacing said side and center rods from the surface of said vehicle, and attaching means carried at said outer end of each side rod for securing said end of said side rod to a portion of said vehicle, said side and center rods being quadrangular in cross-section, said side rods being substantially equal in length and said center rod being of a length substantially equal to the total length of both side rods, said center rod including a longitudinally extending guide slot extending over the major extent of its length, the ends of said guide slot being closed, and guide pins carried by said side rods adjacent said inner ends thereof and slidingly engaged in said guide slot, said support elements being in the shape of a frustum of a pyramid and including a deformable lower surface formed of a relatively soft material for adapting itself to the surface of said vehicle which it engages without marring said vehicle surface, said attaching means including an adjustable belt, a hook carried by said belt for engaging the raingutter of said vehicle, and an upstanding tongue carried by each of said hooks and adapted for engagement of one end of a flexible element for releasably securing luggage and the like on said rack.

References Cited

UNITED STATES PATENTS

| | | |
|---|---|---|
| 2,764,381 | 9/1956 | Anderson. |
| 2,853,119 | 9/1958 | Balfour. |
| 2,988,253 | 6/1961 | Menghi. |
| 3,286,892 | 11/1966 | Marshall. |

FOREIGN PATENTS

| | | |
|---|---|---|
| 789,793 | 8/1935 | France. |
| 1,205,062 | 8/1959 | France. |
| 1,211,727 | 10/1959 | France. |
| 1,333,369 | 6/1963 | France. |

GERALD M. FORLENZA, Primary Examiner